United States Patent [19]
Ray

[11] 4,168,984
[45] Sep. 25, 1979

[54] HYDRAULIC CEMENT MIXES AND PROCESS FOR IMPROVING CEMENT MIXES

[75] Inventor: James A. Ray, Mantua, Ohio
[73] Assignee: Martin Marietta Corporation, Bethesda, Md.
[21] Appl. No.: 876,352
[22] Filed: Feb. 9, 1978
[51] Int. Cl.² ............................................... C04B 7/35
[52] U.S. Cl. ............................ 106/90; 106/104; 106/314; 106/315
[58] Field of Search ............... 106/90, 102, 314, 315, 106/104

[56] References Cited
U.S. PATENT DOCUMENTS
1,998,667   4/1935   Fritz et al. ............................. 106/90

Primary Examiner—James Poer
Attorney, Agent, or Firm—Gay Chin; Ronald G. Ort; George W. Moxon, II

[57] ABSTRACT

Improved hydraulic cement mixes are made by incorporating into such mixes an admixture comprising at least one acetic acid ester of a glycol in an amount sufficient to increase the compressive strength of products made from such mixes. In portland-type cement mixes, these admixtures also act as set accelerators. In high-alumina cement mixes, the admixtures not only increase strength but also inhibit the spontaneous loss of strength which is generally characteristic of high-alumina cements. A preferred admixture is ethylene glycol diacetate in an amount of up to about 3.0% by weight based upon the weight of the cement, preferably in an amount of between about 0.01% and 2.0% by weight.

47 Claims, No Drawings

HYDRAULIC CEMENT MIXES AND PROCESS FOR IMPROVING CEMENT MIXES

BACKGROUND OF THE INVENTION

This invention relates to additive compositions, also known as admixtures, for incorporation in hydraulic cement mixes, for example, hydraulic cement concretes, mortars, grouts, neat cement mixes, nonplastic cement or concrete mixes, such as concrete block mixes, and dry mixes for making such concretes, mortars, and grouts, and more particularly, to the use of such admixtures for improving the compressive strength of products made from such cement mixes. The admixtures of the present invention are glycol acetates, which are acetic acid esters of glycols, and a preferred admixture of the present invention is ethylene glycol diacetate.

Many materials have been used as admixtures for improving the compressive strength of hydraulic cement mixes. In accordance with ordinary usage, it will be understood that references to the strength of hydraulic cement mixes actually refer to the strength of products produced from such mixes after setting and hardening by reaction with water. Among the more commonly used strengthening admixture materials are the lignosulfonates, such as calcium lignosulfonate; salts of hydroxycarboxylic acids; sugars such as glucose (dextrose), maltose, fructose, and the like; and highly polymerized polysaccharides, such as dextrins. In general, these admixtures also reduce the amount of water needed in the hydraulic cement mixes, such water reduction usually resulting in increased compressive strength.

Another effect of the use of these admixtures has generally been the retardation of the rate of setting and hardening of the cement mixes in which they are used. This effect is believed to be the result of a slowing of the chemical process of hydration, so that concrete remains plastic and workable for a longer time than concrete without such a set retarder. Admixtures having set retarding properties are useful as set retarders per se, for example, to delay the set of cement during difficult placements that require the concrete to be in a plastic condition for a longer than normal period of time or to overcome undesired acceleration of set during hot weather. When such set retardation is desirable, then the above admixtures which both improve the strength and retard the set of cement mixes are suitable.

However, frequently there are instances where any significant retarding of the rate of hardening of the cement or concrete mix would be undesirable, or where an acceleration of the set is desired. For example, acceleration may be desired when concrete is to be placed during very cold or even freezing weather conditions, or when minimizing set time is important such as in laying a roadway where use is desired as soon as possible. In instances where both increased strength and set acceleration are desired, it has often been necessary to add a set accelerator in combination with the strengthening admixture. Well-known accelerators are calcium chloride and alkanolamines such as triethanolamine, both of which increase the rate of hydration for early strength development. However, the use of chlorides can lead to a corrosion problem when the concrete is in contact with metal materials. For this reason, chlorides are generally prohibited in prestressed concrete. In addition, many of the known accelerators, such as the alkanolamines and triethanolamine are very expensive and of limited availability. Low molecular weight aldehydes and polymers thereof, for example paraformaldehyde or Paraform, are known to be strong accelerators, but in aqueous solution such materials evolve esthetically objectionable and toxic fumes. As a result, the quantity of these materials that can be incorporated into concrete is very limited.

As will be discussed in detail hereinbelow, the admixtures of the present invention are a class of chemicals known as glycol acetates, which are acetic acid esters of glycols. The use of glycols per se as cement additives is discussed in Bechtold U.S. Pat. No. 2,225,146, Dec. 17, 1940 in which the glycols are used as grinding aids in the production of cement from cement clinker. Another patent, Harada et al U.S. Pat. No. 4,060,425, Nov. 29, 1977, discusses the use of glycols to increase the strength of specially formulated cement base mixtures designated as "super rapid hardening mixtures". Another class of acetic acid esters which have been used as cement additives are the acetic acid esters of glycerol, which are discussed as cement clinker grinding aids in Bechtold U.S. Pat. No. 2,203,809, June 11, 1940.

The aforementioned patents relate to chemicals which are in some ways similar in chemical structure to the glycol acetates of the present invention but which are nevertheless chemically distinct. However, none of these patents is directed toward providing cement admixtures which increase the strength of cement mixes while also providing the unique combination of additional advantages which will now be discussed.

SUMMARY OF THE INVENTION

The present invention stems from the discovery that the incorporation in hydraulic cement mixes of an admixture containing one or more glycol acetates, which are acetic acid esters of glycols, increases the compressive strength of such mixes. In addition, particularly in portland-type cement mixes, the addition of such glycol acetates also generally reduces the setting time of the mix, thus acting both as a set accelerator and a strengthener.

A further and unexpected discovery was the effect of such admixtures on high-alumina cement mixes. Such cement mixes have a known tendency to lose strength with time, a characteristic known as spontaneous retrogression, which will be discussed further below. It was discovered that the use of the admixtures of the present invention not only increases the strength of such mixes but also inhibits their spontaneous retrogression. In fact, with a preferred dosage of glycol acetate admixture, the compressive strength of a high-alumina cement mix actually increased with time. However, in high-alumina cement mixes, the glycol acetate admixtures were also surprisingly found to act as set retarders rather than set accelerators, a feature which, as previously discussed, can be useful for certain types of applications.

A preferred admixture material in accordance with the present invention is ethylene glycol diacetate, and other suitable materials are ethylene glycol monoacetate, diethylene glycol monoacetate and diacetate, and triethylene glycol monoacetate and diacetate. These materials may be used either alone or in combinations with each other or with other admixtures, depending on the desired degree of strengthening and other desired properties.

Broadly, any amount of glycol acetate admixture may be incorporated in hydraulic cement mixes in accordance with the present invention, provided enough is added to increase the strength of such mixes, and provided further that not so much is added that it either becomes economically undesirable or otherwise ceases to be a useful additive. Good results were obtained by adding doses of 0.01-3% admixture to cement mixes, the dosages being stated in percent by weight based upon the weight of the cement in the cement mix. Hereinafter, all amounts or dosages of admixtures will be stated in weight percent based on the weight of the cement, except as otherwise noted. A preferred dosage range for the admixture is 0.1 to 2%, with additional specific preferred ranges and doses being discussed hereinbelow.

In a specific preferred embodiment of the present invention, ethylene glycol diacetate was combined with a glucosaccharide, which is known strengthening admixture, to produce a mix with a strength higher than that obtained with either admixture alone. Similar results were achieved in another preferred embodiment of the present invention in which the ethylene glycol diacetate was combined with a soluble lignosulfonate, a known strengthening admixture, to also produce a mix with a strength higher than that obtained with either admixture alone.

For the purposes of this invention, the term "hydraulic cement" is intended to mean and to include all cementitious compositions capable of being set and hardened by the action of water, such as portland cements, sulfate-resisting cements, blast-furnace cements, pozzolanic cements, and high-alumina cements. The term "cement mix" is intended to include any combination of ingredients with cement, which may be just a simple dry mix of plain cement plus an admixture or a complete concrete mix including cement, aggregate and water. Although the admixture of the present invention is suitable for use with most hydraulic cement mixes, a preferred use in portland-type cement mixes, which is meant to include portland cements and portland blended cements such as those described in ASTM C 595-74. This includes portland cements blended with fly ash, pozzolana slag, blastfurnace slag or mixtures thereof, and other well-known similar materials. Other cements similar to portland cements, such as alite and belite are also intended to be included as portland-type cements.

It is therefore a principal object of this invention to provide a hydraulic cement mix with an admixture incorporated therein which increases the compressive strength of the cement mix.

A further object is to provide a cement mix in which the setting time is generally accelerated by the incorporation of the admixture.

Another object of this invention is to provide a method for improving the compressive strength of a given hydraulic cement mix.

A still further object is to provide such a method which generally accelerates the setting time of portland-type cement mixes.

An additional object is to provide a method for limiting the spontaneous retrogression of the compressive strength of high-alumina cement products.

The foregoing as well as additional objects and advantages of the present invention will be apparent from the following detailed description of several preferred embodiments thereof.

DESCRIPTION OF THE PREFERRED EMBODIMENTS

Materials suitable for use as admixtures in accordance with the present invention are ethylene glycol monoacetate and diacetate, diethylene glycol monoacetate and diacetate, and triethylene glycol monoacetate and diacetate with ethylene glycol diacetate being preferred. These materials may be prepared by the esterification of acetic acid with the desired glycol. The admixture of the present invention may contain one such ester or may be a mixture of two or more such esters.

In the practice of the present invention, the glycol acetate admixture is incorporated into a hydraulic cement mix in an amount sufficient to increase the compressive strength of the hardened mix. The amount of admixture to be added for a specific admixture and a specific hydraulic cement mix would depend on the desired compressive strength and desired effects on setting and hardening time. Generally, it was found that the addition of even very small amounts of such admixtures can provide a significant improvement in compressive strength, with an addition of at least about 0.01% by weight, based on the weight of the cement being preferred and with an addition of at least 0.1% being more preferred. Amounts of admixture in excess of about 3% although still useful are not considered to be commercially economical, due to the generally high cost of these chemicals and the limited additional benefit, and preferably no more than about 2% is used. Other preferred amounts for particular mixes and admixtures will be apparent from the specific examples described below.

The admixture of the present invention is incorporated into hydraulic cement mixes preferably by adding it to a portion of the mix water used for mixing of the hydraulic cement and aggregate. But, the additive could be included as part of a dry cement mix or added in any other convenient manner.

The term aggregate is intended to include both fine aggregate, such as sand, and coarse aggregate, such as crushed stone or gravel, as is common in the art. In general for mortars, the aggregate may be sand or other fine aggregate meeting the requirements of ASTM standard C-33. In general for concretes, the aggregate may be sand or other fine aggregate plus crushed stone or gravel or other coarse aggregate in accordance with ASTM standard C-33. The precise size, purity, quality and quantity, or ranges thereof, of the fine and coarse aggregates will vary depending upon the desired use and properties of the mortar or concrete. For most common uses, although not limited thereto, the size of the fine aggregate will be within the broad range of about 4 mesh to 100 mesh (4.76 mm to 0.149 mm) while the size of the coarse aggregate will be within the broad range of about 3 inches to 4 mesh (76.1 mm to 4.76 mm). The coarse aggregate will usually be of mineral origin, such as gravel or crushed rock, but it may in sone cases consist at least partially of graded metallic material such as iron chips, slag, or other manufactured aggregate.

Further, in general for dry mortar mixes, the amount of the fine aggregate in the mix will be in the range of about 25% to about 75% by weight based upon the weight of the cement mix, depending upon the nature of the aggregate and the desired properties of the mix. For dry concrete mixes, the fine and coarse aggregates will fall generally within the broad range of 20% to 80% by weight of the mix and 5% to 60% by weight of the mix, respectively, depending upon the desired properties and use of the mix.

For both the mortars and cements, the amount of water employed generally should be enough to effect hydraulic setting of the cement present in the mix and to provide suitable workability. This may broadly range without additives. The difference in setting time is expressed in hours, with a shorter setting time, or set acceleration indicated by a (−) sign, and a longer setting time or set retardation indicated by a plus (+) sign. The compressive strength is given for samples tested after 7 days and samples tested after 28 days.

Table I

| Mix No. | Additive | Dose; weight percent | Water content; lb/yd³(Kg/m³) | Air content; volume percent | Relative rate of hardening; hours | Compressive strength of cement product; | |
|---|---|---|---|---|---|---|---|
| | | | | | | 7 days psi (MPa) | 28 days psi (MPa) |
| Cement No. 1 | | | | | | | |
| 1 | None | — | 311 (184.5) | 1.7 | 0 | 2895 (19.96) | 4040 (27.85) |
| 2 | Ethylene Glycol Diacetate | 0.01 | 309 (183.3) | 1.9 | −¼ | 3370 (23.24) | 4260 (29.37) |
| 3 | " | 0.025 | 303 (179.8) | 2.0 | −⅜ | 3255 (22.44) | 4200 (28.96) |
| 4 | " | 0.05 | 303 (179.8) | 2.2 | −⅜ | 3350 (23.10) | 4420 (30.47) |
| 5 | " | 0.1 | 301 (178.6) | 2.4 | −⅜ | 3440 (23.72) | 4440 (30.61) |
| 6 | " | 0.25 | 300 (178.0) | 2.6 | −⅜ | 3285 (22.65) | 4805 (33.13) |
| 7 | " | 0.5 | 297 (176.2) | 2.9 | −⅞ | 3285 (22.65) | 4445 (30.65) |
| 8 | " | 1.0 | 293 (173.8) | 3.2 | −1⅜ | 3420 (23.58) | 4495 (30.99) |
| 9 | " | 2.0 | 289 (171.5) | 3.4 | −1⅜ | 3320 (22.89) | 4395 (30.30) |
| 10 | Triethanolamine | 0.025 | 305 (180.9) | 2.0 | −1⅛ | 3260 (22.48) | 4420 (30.47) |
| Cement No. 2 | | | | | | | |
| 11 | None | — | 318 (188.7) | 1.6 | 0 | 3240 (22.34) | 4965 (34.23) |
| 12 | Ethylene Glycol Diacetate | 0.01 | 312 (185.1) | 1.7 | −¼ | 3400 (23.44) | 4975 (34.30) |
| 13 | " | 0.025 | 309 (183.3) | 1.9 | −¼ | 3420 (23.58) | 5045 (34.78) |
| 14 | " | 0.05 | 307 (182.1) | 1.9 | −¼ | 3450 (23.79) | 5015 (34.58) |
| 15 | " | 0.1 | 306 (181.5) | 2.0 | 0 | 3585 (24.72) | 5260 (36.27) |
| 16 | " | 0.25 | 306 (181.5) | 2.4 | 0 | 3645 (25.13) | 5210 (35.92) |
| 17 | " | 0.5 | 304 (180.4) | 2.5 | 0 | 3550 (24.48) | 5070 (34.96) |
| 18 | " | 1.0 | 302 (179.2) | 2.8 | 0 | 3460 (23.86) | 4995 (34.44) |
| 19 | " | 2.0 | 300 (178.0) | 3.3 | +¼ | 3440 (23.72) | 5020 (34.61) |
| 20 | Triethanolamine | 0.025 | 308 (182.7) | 2.7 | −⅜ | 3540 (24.41) | 5100 (35.16) | from about 20% to 60% by weight of the cement in the mix for the concretes. The precise amounts of water will depend upon the end use of the cement mix, as well as the aggregate present in the mix.

For purposes of illustrating the advantageous results obtainable by the practice of the present invention, plain cement mixes were prepared and compared with such mixes in which admixtures in accordance with the present invention were incorporated. The same type and brand of cement was used in each mix, and the proportion and kind of aggregate employed were substantially the same. A sufficient amount of water was added to each mix to effect hydraulic setting of the cement mix and to produce mixes of essentially the same consistency. In addition and for purposes of further illustrating the invention, comparison tests were made using triethanolamine, which is a known admixture used as an accelerator, and with other admixtures as discussed further below.

The results of Mix Nos. 1-20 shown in Table I illustrate the use of ethylene glycol diacetate in two different, but commercially available, Type I portland cement mixes to form concrete. The fine aggregate to coarse aggregate ratio employed was 0.46, the amount of cement employed was about 5 sacks per yard (i.e. cubic yard or 0.7646 cubic meters) of concrete (a U.S. sack of cement weighs about 94 pounds or 42.64 kg), and the concrete had slumps in the range of 3¼ to 3¾ inches (8.255 to 9.525 cm). The dose is given in weight percent based on the weight of the cement, the water content is in pounds per cubic yard (or kilograms per cubic meter) of concrete product, and the air content is in volume percent based on the volume of concrete product. The relative rate of hardening is the difference in the setting time required for concrete samples with additives compared to the time for a control sample As can be seen, the use of ethylene glycol diacetate resulted in higher compressive strengths than similar mixes without the additive. The Cement No. 1 and Cement No. 2 mixes both showed particularly improved 7 and 28 day compressive strengths when the ethylene glycol diacetate was added in doses of 0.1% to 2%. Furthermore, in the Cement No. 1 mixes, the ethylene glycol diacetate reduced setting time significantly, particularly in doses of 0.5% and higher.

To demonstrate the effectiveness of using triethylene glycol diacetate as an admixture in accordance with the present invention, Mix Nos. 21-40 were prepared and tested in accordance with the procedure set forth for Mix Nos. 1-20 above, with the results shown in Table II. The same types and amounts of cements were used as in Mix Nos. 1-20, the fine to coarse aggregate ratio was again 0.46, and the slumps were in the range of 3¼ to 3¾ inches (8.255 to 9.525 cm). As can be seen the triethylene glycol diacetate admixture was more effective in Cement No. 1 than in Cement No. 2 both as a strengthener and accelerator. In Cement No. 2, the tests showed a reduced 7-day strength with the triethylene glycol diacetate admixture, but an increase in the 28-day strength when added in small doses.

The results in Table III illustrate the use of ethylene glycol diacetate in a larger dose, in combination with other admixtures, and in a calcium aluminate cement. The doses given in Table III for Mix Nos. 47-49 indicate the total dose as well as the respective amounts of each admixture in the dose. The Mix Nos. 41-50 were made as in the previous mixes with Cement No. 1, with a fine to coarse aggregate ratio of 0.46, but with the slumps in the wider range of 3 to 4 inches (7.62 to 10.16 cm). Mix No. 43, which had a dose of 3.0% ethylene glycol diacetate showed improved strength as well as some set acceleration.

strengthener with either glucosaccharides or soluble lignosulfonates.

Table II

| Mix No. | Additive | Dose; weight percent | Water content; lb/yd³(Kg/³) | Air content; volume percent | Relative rate of hardening; hours | Compressive strength of cement product; | |
|---|---|---|---|---|---|---|---|
| | | | | | | 7 days psi (MPa) | 28 days psi (MPa) |
| Cement No. 1 | | | | | | | |
| 21 | None | — | 312 (185.1) | 1.6 | 0 | 3330 (22.96) | 4860 (33.51) |
| 22 | Triethanolamine | 0.025 | 308 (182.7) | 1.9 | −1 | 3570 (24.61) | 4985 (34.37) |
| 23 | Triethylene Glycol Diacetate | 0.01 | 304 (180.4) | 2.0 | −⅜ | 3450 (23.79) | 5110 (35.23) |
| 24 | " | 0.025 | 301 (178.6) | 2.2 | −⅜ | 3570 (24.61) | 5130 (35.37) |
| 25 | " | 0.05 | 301 (178.6) | 2.4 | −½ | 3660 (25.23) | 5050 (34.82) |
| 26 | " | 0.10 | 299 (177.4) | 2.9 | −½ | 3725 (25.68) | 5120 (35.30) |
| 27 | " | 0.25 | 299 (177.4) | 3.1 | −½ | 3655 (25.20) | 4950 (34.13) |
| 28 | " | 0.50 | 298 (176.8) | 3.3 | −½ | 3610 (24.89) | 5055 (34.85) |
| 29 | " | 1.0 | 295 (175.0) | 3.6 | −½ | 3625 (24.99) | 5075 (34.99) |
| 30 | " | 2.0 | 291 (172.6) | 3.5 | −1 | 3480 (23.99) | 4745 (32.72) |
| Cement No. 2 | | | | | | | |
| 31 | None | — | 315 (186.9) | 1.6 | 0 | 3605 (24.86) | 4880 (33.65) |
| 32 | Triethanolamine | 0.025 | 311 (184.5) | 1.9 | −⅜ | 3500 (24.13) | 4955 (34.16) |
| 33 | Triethylene Glycol Diacetate | 0.01 | 312 (185.1) | 2.0 | −⅜ | 3455 (23.82) | 4925 (33.96) |
| 34 | " | 0.025 | 312 (185.1) | 2.2 | −¼ | 3400 (23.44) | 5050 (34.82) |
| 35 | " | 0.05 | 311 (184.5) | 2.2 | −¼ | 3470 (23.92) | 4960 (34.20) |
| 36 | " | 0.10 | 310 (183.9) | 2.4 | −¼ | 3480 (23.99) | 5040 (34.75) |
| 37 | " | 0.25 | 309 (183.3) | 2.7 | −¼ | 3550 (24.48) | 4985 (34.37) |
| 38 | " | 0.50 | 308 (182.7) | 3.0 | −⅛ | 3440 (23.72) | 4680 (32.27) |
| 39 | " | 1.0 | 308 (182.7) | 3.0 | 0 | 3490 (24.06) | 4790 (33.03) |
| 40 | " | 2.0 | 305 (180.9) | 3.5 | 0 | 3080 (21.24) | 4485 (30.92) |

The first admixture tested with the ethylene glycol diacetate was a commercially available glucosaccharide, of the type described in U.S. Pat. No. 3,432,317, which generally acts as a retarder although it slightly accelerated the set here. The results of the tests on Mix No. 47 showed that the combination of the ethylene glycol diacetate and the glucosaccharide produced a concrete with much higher strength than with either admixture alone. In like manner, the ethylene glycol diacetate combined with a calcium lignosulfonate in Mix No. 49 also produced a significantly stronger concrete than with either admixture alone. The particular calcium lignosulfonate used here was a commercially available product sold under the name Lignosol, although any soluble lignosulfonate would be suitable. This illustrates the additive strengthening effect of combining these admixtures. At the same time the retarding effects of the glucosaccharide and the lignosulfonate were effectively neutralized by the accelerating effect of the ethylene glycol diacetate, thus enabling these strengthening admixtures to be used even when set retardation would be undesirable. However, the ethylene glycol diacetate did not work additively with the triethanolamine, and in fact the combination of the two in Mix No. 48 actually reduced the strength of the concrete product. This emphasizes the significance of the discovery that ethylene glycol diacetate is an additive Mix Nos. 51-55 were prepared with a calcium aluminate cement, also known as high-alumina cement, to illustrate the effect of the admixture of the present invention on a non-portland hydraulic cement. The mixes were prepared with about 517 pounds of cement per cubic yard of concrete (234.5 kg per 0.7646 cubic meters or 306.7 kg/m³), with aggregate having a fine to coarse ratio of 0.46, and having slumps in the range of about 3½ to 4 inches (8.89 to 10.16 cm). High-alumina cement products are generally characterized by high initial strength (as compared to portland cements) but with decreasing strength over long periods of time. This is illustrated by the lower 28-day strength of Mix No. 51 as compared to its 7-day strength. This characteristic makes such cement less desirable for structural purposes due to this spontaneous retrogression of compressive strength. The ethylene glycol diacetate not only improved both the 7-day and 28-day strengths of this cement, but also inhibited the tendency of this cement to decrease in strength. In fact, the 28-day strength of Mix No. 54 with 0.1% admixture was even higher than its 7-day strength. However, the ethylene glycol diacetate had a retardative effect on the rate of hardening of this cement, with Mix No. 55 being so retarded that it had not set after 24 hours. Because of this, the addition of this admixture to this type of cement is preferably limited to less than 1.0%. This does not mean that higher doses might not be usable in combination with a suitable set accelerator or if high retardation is desired.

Table III

| Mix No. | Additive | Dose; weight percent | Water content; lb/yd (Kg/m) | Air content; volume percent | Relative rate of hardening hours | Compressive strength of cement product; | |
|---|---|---|---|---|---|---|---|
| | | | | | | 7 days psi (MPa) | 28 days psi (MPa) |
| Cement No. 1 | | | | | | | |
| 41 | None | — | 306 (181.5) | 1.5 | 0 | 3250 (22.41) | 4670 (32.20) |
| 42 | Ethylene Glycol Diacetate | 2.0 | 293 (173.8) | 3.5 | −⅞ | 3220 (22.20) | 4640 (31.99) |
| 43 | " | 3.0 | 275 (163.2) | 3.6 | −⅜ | 3370 (23.24) | 4930 (33.99) |
| 44 | Glucosaccharide | 0.05 | 290 (172.1) | 1.5 | −¼ | 3660 (25.23) | 5160 (35.58) |

Table III-continued

| Mix No. | Additive | Dose; weight percent | Water content; lb/yd (Kg/m) | Air content; volume percent | Relative rate of hardening hours | Compressive strength of cement product; 7 days psi (MPa) | 28 days psi (MPa) |
|---|---|---|---|---|---|---|---|
| 45 | Triethanolamine | 0.025 | 301 (178.6) | 2.3 | −¼ | 3690 (25.44) | 5120 (35.30) |
| 46 | Calcium Lignosulfonate | 0.25 | 285 (169.1) | 3.0 | +¾ | 3850 (26.54) | 5170 (35.65) |
| 47 | Ethylene Glycol Diacetate Glucosaccharide | 0.55 Total (0.5 + 0.05) | 296 (175.6) | 3.3 | −⅜ | 4000 (27.58) | 5670 (39.09) |
| 48 | Ethylene Glycol Diacetate Triethanolamine | 0.525 Total (0.5 + 0.025) | 284 (168.5) | 3.2 | −1 | 3180 (21.93) | 4220 (29.10) |
| 49 | Ethylene Glycol Diacetate Calcium Lignosulfonate | 0.75 Total (0.5 + 0.25) | 272 (161.4) | 4.0 | +¼ | 4190 (28.39) | 5860 (40.40) |
| 50 | Ethylene Glycol Diacetate | 0.5 | 292 (173.2) | 2.9 | −⅜ | 3750 (25.86) | 5430 (37.44) |
| Calcium Aluminate Cement | | | | | | | |
| 51 | None | — | 316 (187.5) | 1.0 | 0 | 4420 (30.47) | 4060 (27.99) |
| 52 | Ethylene Glycol Diacetate | 0.01 | 305 (180.9) | 2.1 | +⅜ | 4850 (33.44) | 4650 (32.06) |
| 53 | " | 0.05 | 303 (179.8) | 2.8 | +1¼ | 4910 (33.85) | 4630 (31.92) |
| 54 | " | 0.1 | 298 (176.8) | 3.0 | +3 | 5170 (35.65) | 5200 (35.85) |
| 55 | " | 1.0 | 295 (175.0) | 3.5 | +24 | No Test | No Test |

It is within the scope of this invention to incorporate in the cement mixes as herein provided other additives known in the art for the express purpose for which they are normally employed. Such additives may, for example be air-entraining agents, air-detraining agents, pozzolanic materials, fly ash, coloring agents, water repellants, set accelerators, and the like. Furthermore, as demonstrated above, the admixtures of the present invention may be additively used with other admixtures, taking into account the accelerating effect this will generally have on the retarding or accelerating effects of such other admixtures.

The terms and expressions which have been employed are used in terms of description and not of limitation, and there is no intention in the use of such terms and expressions of excluding any equivalents of the features shown and described or portions thereof, but it is recognized that various modifications are possible within the scope of the invention claimed.

What I claim is:

1. A hydraulic cement mix containing hydraulic cement and an admixture comprising at least one acetic acid ester of a glycol, said admixture being present in an amount less than about 3% by weight based upon the weight of the cement and sufficient to increase the compressive strength of products in the set and hardened condition produced from said cement mix.

2. The hydraulic cement mix of claim 1 containing at least about 0.01% of said esters by weight based upon the weight of the cement.

3. The hydraulic cement mix of claim 2 containing less than about 2% of said esters.

4. The hydraulic cement mix of claim 2 containing at least about 0.1% of said esters.

5. The hydraulic cement mix of claim 1 wherein said esters comprise a glycol acetate selected from the group consisting of ethylene glycol monoacetate, ethylene glycol diacetate, diethylene glycol monoacetate, diethylene glycol diacetate, triethylene glycol monoacetate, triethylene glycol diacetate, and combinations thereof.

6. The hydraulic cement mix of claim 5 wherein the glycol acetate is ethylene glycol diacetate.

7. The hydraulic cement mix of claim 6 containing at least about 0.01% ethylene glycol diacetate by weight based upon the weight of the cement.

8. The hydraulic cement mix of claim 7 containing less than about 2% ethylene glycol diacetate.

9. The hydraulic cement mix of claim 7 containing at least about 0.1% ethylene glycol diacetate.

10. The hydraulic cement mix of claim 7 containing at least about 0.5% ethylene glycol diacetate.

11. The hydraulic cement mix of claim 6 wherein the glycol acetate is triethylene glycol diacetate.

12. The hydraulic cement mix of claim 11 containing at least about 0.01% triethylene glycol diacetate by weight based upon the weight of the cement.

13. The hydraulic cement mix of claim 12 containing less than about 2% triethylene glycol diacetate.

14. The hydraulic cement mix of claim 6 wherein the admixture further includes a glucosaccharide.

15. The hydraulic cement mix of claim 14 containing about 0.5% ethylene glycol diacetate and about 0.05% glucosaccharide by weight based upon the weight of the cement.

16. The hydraulic cement mix of claim 14 wherein the hydraulic cement is portland-type cement.

17. The hydraulic cement mix of claim 15 wherein the hydraulic cement is portland-type cement.

18. The hydraulic cement mix of claim 6 wherein the admixture includes a soluble lignosulfonate.

19. The hydraulic cement mix of claim 18 containing about 0.5% ethylene glycol diacetate and about 0.25% soluble lignosulfonate.

20. The hydraulic cement mix of claim 18 wherein the hydraulic cement is portland-type cement.

21. The hydraulic cement mix of claim 19 wherein the hydraulic cement is portland-type cement.

22. A process for increasing the compressive strength of products in the set and hardened condition produced from hydraulic cement mixes comprising incorporating in said cement mixes an admixture comprising at least one acetic acid ester of a glycol.

23. The process of claim 22 wherein the amount of said esters incorporated in said hydraulic cement mix is at least about 0.01% by weight based on the weight of the cement in said hydraulic cement mix.

24. The process of claim 23 wherein the amount of said esters is less than about 3%.

25. The process of claim 23 wherein the amount of said esters is less than about 2%.

26. The process of claim 23 wherein the amount of said esters is about 0.1 to 2%.

27. The process of claim 24 wherein said esters comprise a glycol acetate selected from the group consisting of ethylene glycol monoacetate, ethylene glycol diacetate, diethylene glycol monoacetate, diethylene glycol diacetate, triethylene glycol monoacetate, triethylene glycol diacetate, and combinations thereof.

28. The process of claim 27 wherein the glycol acetate is ethylene glycol diacetate.

29. The process of claim 28 wherein the amount of said ethylene glycol diacetate incorporated in said hydraulic cement mix is about 0.01 to 3% by weight based upon the weight of the cement in the cement mix.

30. The process of claim 29 wherein the amount of ethylene glycol diacetate is about 0.1 to 2%.

31. The process of claim 27 wherein the glycol acetate is triethylene glycol diacetate.

32. The process of claim 31 wherein the triethylene glycol diacetate incorporated in said hydraulic cement mix is about 0.01 to 2% by weight based upon the weight of the cement in the cement mix.

33. The process of claim 28 further comprising incorporating in said hydraulic cement mix a glucosaccharide.

34. The process of claim 28 further comprising incorporating in said hydraulic cement mix a soluble lignosulfonate.

35. A process for increasing the compressive strength and accelerating the rate of hardening of products produced from portland-type cement mixes comprising incorporating in said portland-type cement mixes a glycol acetate selected from the group consisting of ethylene glycol monoacetate, ethylene glycol diacetate, diethylene glycol monoacetate, diethylene glycol diacetate, triethylene glycol monoacetate, triethylene glycol diacetate, and combinations thereof.

36. The process of claim 35 wherein the amount of said glycol acetate incorporated in said portland-type cement mix is about 0.01 to 3% by weight based upon the weight of the cement in said mix.

37. The process of claim 36 wherein the amount of glycol acetate is less than about 2%.

38. The process of claim 36 wherein the glycol acetate is ethylene glycol diacetate.

39. The process of claim 37 wherein the glycol acetate is ethylene glycol diacetate.

40. The process of claim 39 wherein the amount of ethylene glycol diacetate is about 0.5 to 2%.

41. The process of claim 37 wherein the glycol acetate is triethylene glycol diacetate.

42. A process for increasing the compressive strength of products in the set and hardened condition produced from high-alumina cement mixes and for inhibiting the spontaneous retrogression of such strength in such products with time comprising incorporating in said high-alumina cement mixes a glycol acetate selected from the group consisting of ethylene glycol monoacetate, ethylene glycol diacetate, diethylene glycol monoacetate, diethylene glycol diacetate, triethylene glycol monoacetate, triethylene glycol diacetate, and combinations thereof.

43. The process of claim 42 wherein the amount of said glycol acetate incorporated in said high-alumina cement mix is less than about 1% by weight based upon the weight of the cement in said cement mix.

44. The process of claim 43 wherein the amount of glycol acetate is at least about 0.01%.

45. The process of claim 43 wherein the glycol acetate is ethylene glycol diacetate.

46. The process of claim 44 wherein the glycol acetate is ethylene glycol diacetate.

47. The process of claim 46 wherein the amount of ethylene glycol diacetate is about 0.1%.

* * * * *

UNITED STATES PATENT AND TRADEMARK OFFICE
CERTIFICATE OF CORRECTION

PATENT NO. : 4,168,984
DATED : September 25, 1979
INVENTOR(S) : James A. Ray

It is certified that error appears in the above-identified patent and that said Letters Patent are hereby corrected as shown below:

Column 3, line 16, after "which is" insert --a--.
Column 5, line 46, after "produce" insert --cement--.
Columns 9-10 in Table III for Mix No. 45, under "Relative rate of hardening", "1/4" should read --1 1/4--; for Mix No. 49, under "Compressive strength", subheading "7 days (MPa)", "28.39" should read --28.89--.
Column 10, line 26, claim 11, "claim 6" should read --claim 5--;
Column 10, line 67, claim 27, "claim 24" should read --claim 22--.

Signed and Sealed this

Twenty-fifth Day of March 1980

[SEAL]

Attest:

SIDNEY A. DIAMOND

Attesting Officer

Commissioner of Patents and Trademarks